May 2, 1961 A. J. W. M. VAN OVERBEEK ET AL 2,982,918

AMPLIFYING-CIRCUIT ARRANGEMENT

Filed Nov. 9, 1953

INVENTORS
ADRIANUS JOHANNES WILHELMUS
MARIE VAN OVERBEEK
FREDERIK HENDRIK STIELTJES

BY [signature]

AGENT

United States Patent Office 2,982,918
Patented May 2, 1961

2,982,918

AMPLIFYING-CIRCUIT ARRANGEMENT

Adrianus Johannes Wilhelmus Marie van Overbeek and Frederik Hendrik Stieltjes, Eindhoven, Netherlands, assignors, by mesne assignments, to North American Philips Company, Inc., New York, N.Y., a corporation of Delaware Filed Nov. 9, 1953, Ser. No. 391,083

8 Claims. (Cl. 330—17)

The present invention relates to amplifying circuit arrangements. More particularly, the invention relates to amplifying-circuit arrangements for electrical signal oscillations supplied to the input circuit of a first transistor whose output circuit is associated with the input circuit of a second transistor, thus producing amplified signal oscillations in the output circuit of the second transistor.

Cascade circuit arrangements of current-amplifying point-contact transistors with grounded base-electrodes are known in the art. Point-contact transistors have the advantage that their current-amplification factor, i.e. the ratio between the alternating current to the collector electrode and the alternating current to the emitter electrode with constant collector voltage exceeds unity and that they are more suitable for high frequencies than "junction" transistors. They suffer, however, from the disadvantage that the input impedance, notably if the voltage to be amplified is supplied to the base circuit, is lower than that of a junction transistor. Moreover, their amplification involves more noise than in the case of a junction transistor.

The present invention utilizes on the one hand the suitable properties of a junction transistor and aims on the other hand at avoiding the disadvantage that a junction transistor is unsuitable for high frequencies. According to the invention, at least the first transistor is a junction transistor and the base of the second transistor is connected to a point of constant potential at least with respect to the frequencies of the oscillations produced in the output circuit of the second transistor.

The two transistors are more particularly united to form a single transistor comprising at least five zones of alternately opposite conductivity type with the omission of the collector of the first transistor and the emitter of the second transistor. It is pointed out that transistors comprising, for example, five zones of alternately opposite conductivity type are known. However, these transistors are not connected according to the invention.

In order that the invention may be readily carried into effect it will now be described in greater detail with reference to the accompanying drawing, given by way of example, in which.

Figure 1:
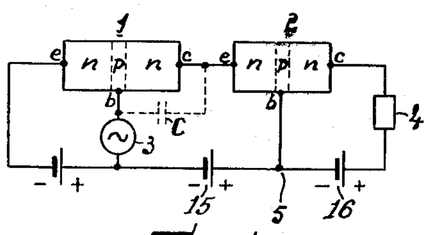
Fig. 1 is a schematic diagram of an embodiment of the circuit arrangement of the present invention.

The circuit arrangement shown in Fig. 1 comprises two transistors 1 and 2 each comprising an emitter electrode *e*, a base electrode *b* and a collector electrode *c*. The input circuit, that is to say the circuit between the emitter *e* and the base *b*, of the first transistor 1 comprises a source 3 of signal oscillations to be amplified. The output circuit, that is the circuit between the collector *c* and the base *b*, of the first transistor 1 is associated with the input circuit of the second transistor 2 whose output circuit comprises an output impedance 4 via which amplified signal oscillations are produced. The various zones of opposite conductivity type can be thought of as being a plurality of pairs of zones of opposite conductivity type.

The transistors 1 and 2 in a known circuit arrangement are current-amplifying point-contact transistors. It was hitherto held that there is little point in replacing at least the first of these point-contact transistors by a junction transistor, for example an npn transistor as shown in Fig. 1, since thereby the range of frequencies for which the amplifying circuit-arrangement is suitable would apparently be considerably limited. Since, moreover, the current-amplification factor of a junction transistor is smaller than unity, so that the output alternating current obtained is smaller than the input alternating current from the signal source, a transistor thus connected might better be omitted.

The present invention is based on the recognition that the limitation of the frequency range to a point at which junction transistors are normally practicable does not hold for the present circuit-arrangement. According to this recognition, the reduction is based on the fact that a considerable capacity C is active between the collector *c* and the base *b* as a result of the p-n junction operated in its blocking direction, via which capacity C the alternating voltage of the first transistor 1 set up at the collector *c* reacts on the source 3 of input voltage. This reaction is, however, neutralized by the n-p junction of the input circuit of the second transistor, which junction is operated in its pass-direction and consequently has a low input impedance. The base circuit of the second transistor is connected to a point 5 of constant potential; this point may be located between the two potential sources 15 and 16 as shown; the "dead" end of the source 3 of signal voltage is coupled to the output impedance 4 through potential sources 15 and 16, so that the emitter *e* of the second transistor also carries a substantially constant voltage.

Figure 2:
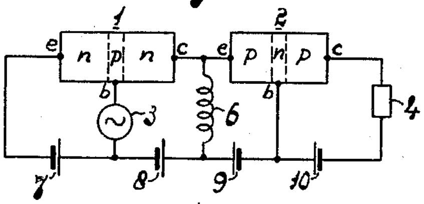
Fig. 2 is a modificaton of the embodiment of Fig. 1.

In Fig. 2, the conductivity type of the zones of the transistor 2 is reversed, whereby the polarity of the associated sources of supply voltage is also reversed. In contradistinction to the circuit-arrangement shown in Fig. 1, where the currents produced at the emitter and collector of the transistors 1 and 2 are substantially equal, the A.C. components of these currents now are substantially equal, but the D.C. components or opposed. In this case, it is only necessary for a choke 6 to present a large impedance for the signal frequencies with respect to the input impedance of the transistor 2.

Of course, the sources of supply voltage shown in the drawing may be combined with or, for example, be replaced by, supply voltages taken from a single source of supply voltage via resistors decoupled for the range of frequencies to be amplified.

Figure 3:
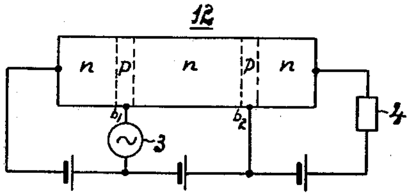
Fig. 3 is another modification of the embodiment of Fig. 1, utilizing a single transistor comprising five zones of alternately opposite conductivity type.

In the circuit arrangement shown in Fig. 3, the two transistors 1 and 2 shown in Fig. 1 are united to form a single transistor 12 comprising five zones of alternately opposite conductivity type n and p respectively, so that the collector *c* of the first transistor and the emitter *e* of the second transistor and the associated connection can be dispensed with. The source 3 of signal voltage is connected to one base $b_1$. The other base $b_2$, which is maintained at a constant potential, as shown, serves effectively as a shield which prevents feedback effects of the output signal to the input signal portion of the transistor circuit.

Figure 4:
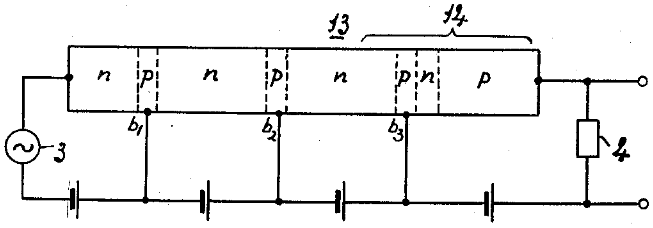
Fig. 4 is a modification of the embodiment of the circuit arrangement of Fig. 3.

In the circuit-arrangement shown in Fig. 4, the transistor 13 comprises three base-electrodes $b_1$, $b_2$ and $b_3$, the electrodes $b_2$ and $b_3$ again serving to counteract reaction of the output voltage on the input. The npn end section of the transistor 12 shown in Fig. 3 is replaced by a four zone npnp end section 14, thus obtaining, as is known, a considerable additional current-amplification.

What is claimed is:

1. An amplifying circuit arrangement comprising two three-zone junction resistors constituted by a unitary body having five zones of alternately opposite conductivity type, the center zone being common to each of said transistors and constituting the collector of the first transistor and the emitter of the second transistor, the first and second zones constituting the emitter and base respectively of the first transistor, the fourth and fifth zones constituting the base and collector respectively of the second transistor, means for applying an input signal voltage to the base of the first transistor and means for deriving an output signal voltage from the collector of the second transistor, a first source of bias potential connected between the base and emitter electrodes of the first transistor, a second source of bias potential connected between the base and collector electrodes of the second transistor, the base of the second transistor being connected to a point of constant potential at least with respect to the frequnecy of said output signal.

2. An amplifying circuit-arrangement, as set forth in claim 1, wherein the fifth zone of said unitary body is constituted by a current-amplifying four-zone section.

3. An amplifying circuit-arrangement comprising a transistor device constituted by a unitary body having successively a first n-type conductivity zone having an emitter electrode, a first p-type conductivity zone having a base electrode, a second n-type conductivity zone, a second p-type conductivity zone having a base electrode and a third n-type conductivity zone having a collector electrode, the base electrode of said second p-type zone being connected to a point of constant potential, an input signal source connected to the base electrode of said first p-type zone, a first source of bias potential connected between said first n-type and p-type zones, a second source of bias potential connected between said second p-type and third n-type zones, means for applying a signal voltage to said input circuit, and an output circuit including an output impedance yielding an amplified signal connected between the collector electrode of said third n-type zone and the base electrode of said second p-type zone.

4. An amplifying circuit-arrangement, as set forth in claim 3, wherein said input and output circuits each include a unidirectional voltage source and further including a unidirectional voltage source coupled between the base electrodes of said first and second p-type zones.

5. An amplifying circuit-arrangement comprising a transistor device constituted by a unitary body having successively a first n-type conductivity zone having an emitter electrode, a first p-type conductivity zone having a base electrode, a second n-type conductivity zone, a second p-type conductivity zone having a base electrode, a third n-type conductivity zone, a third p-type conductivity zone having a base electrode, a fourth n-type conductivity zone and a fourth p-type conductivity zone having a collector electrode, the base electrode of said second p-type zone being connected to a point of constant potential, a first source of bias potential connected between said first n-type and p-type zones, a second source of bias potential connected between said second p-type zone and said third p-type zone, a third source of bias potential connected between said third p-type zone and said fourth p-type zone, an input signal source connected to the base electrode of said first p-type zone, means for applying a signal voltage to said input circuit, and an output circuit including an output impedance yielding an amplified signal connected between the collector electrode of said fourth p-type zone and the base electrode of said third p-type zone.

6. An amplifying circuit-arrangement, as set forth in claim 5, wherein said input and output circuits each include a unidirectional voltage source and further including a third unidirectional voltage source coupled between the base electrodes of said first and second p-type zones, and a fourth unidirectional voltage source coupled between the base electrodes of said second and third p-type zones.

7. An amplifying circuit arrangement comprising first and second junction transistors each having successively a first n-type conductivity zone having an emitter electrode, a first p-type conductivity zone having a base electrode, and a second n-type conductivity zone having a collector electrode, the collector electrode of said first transistor being connected to the emitter electrode of said second transistor, a source of input oscillations connected at one terminal to the base electrode of said first transistor, a first bias voltage source connected between the emitter electrode of said first transistor and the other terminal of said input oscillation source, an output impedance connected at one terminal to the collector electrode of said second transistor, a second bias voltage source connected between the other terminal of said output impedance and the base electrode of said second transistor, and a third bias voltage source connected between the base electrode of said second transistor and the other terminal of said input oscillation source.

8. An amplifying circuit arrangement comprising two three-zone junction transistors each having an emitter zone, a base zone and a collector zone respectively, the corresponding zones of the transistors being of the same conductivity type, the base zone of each transistor being of an opposite conductivity type from the emitter and collector zones, means for applying an input signal voltage to the base zone of the first transistor, a direct conductive connection between the collector zone of the first transistor and the emitter zone of the second transistor, a first source of bias potential connected between the base and emitter zones of the first transistor, a second source of bias potential connected between the base and collector zones of the second transistor, means for deriving an output signal voltage from the collector zone of the second transistor, the base zone of the second transistor being connected to a point of constant potential at least with respect to the frequency of said output signal.

References Cited in the file of this patent

UNITED STATES PATENTS

| | | |
|---|---|---|
| 2,569,347 | Shockley | Sept. 25, 1951 |
| 2,586,080 | Pfann | Feb. 19, 1952 |
| 2,600,500 | Haynes et al. | June 17, 1952 |
| 2,663,806 | Darlington | Dec. 22, 1953 |
| 2,663,830 | Oliver | Dec. 22, 1953 |
| 2,666,818 | Shockley | Jan. 19, 1954 |
| 2,695,930 | Wallace | Nov. 30, 1954 |
| 2,730,576 | Caruthers | Jan. 10, 1956 |
| 2,711,545 | Chase | June 19, 1956 |
| 2,791,644 | Sziklai | May 7, 1957 |
| 2,802,065 | Sziklai | Aug. 6, 1957 |

FOREIGN PATENTS

| | | |
|---|---|---|
| 665,867 | Great Britain | Jan. 30, 1952 |